(12) United States Patent
Watts, Jr.

(10) Patent No.: US 6,804,740 B1
(45) Date of Patent: Oct. 12, 2004

(54) DOCKING STATION FOR USE WITH A PORTABLE COMPUTER SYSTEM

(75) Inventor: La Vaughn F. Watts, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 538 days.

(21) Appl. No.: 09/672,132

(22) Filed: Sep. 27, 2000

(51) Int. Cl.[7] ............................................. G06F 13/00

(52) U.S. Cl. ...................... 710/303; 708/139; 361/683

(58) Field of Search ................................ 710/303, 300, 710/304, 302, 72, 104; 709/220, 250; 713/300; 361/683, 729, 686, 727; 235/472.01, 472.02; 708/139

(56) References Cited

U.S. PATENT DOCUMENTS

| 5,347,425 A | * | 9/1994 | Herron et al. ............... 361/686 |
| 5,526,493 A | | 6/1996 | Shu |
| 5,579,487 A | * | 11/1996 | Meyerson et al. |
| 5,864,708 A | * | 1/1999 | Croft et al. ..................... 710/1 |
| 5,867,406 A | * | 2/1999 | Yanagisawa |
| 6,009,486 A | * | 12/1999 | Dayan et al. ................ 710/303 |

* cited by examiner

Primary Examiner—Gopal C. Ray
(74) Attorney, Agent, or Firm—Haynes and Boone, LLP

(57) ABSTRACT

A method including but not limited to detecting a docking device class circuit present on a bus, and obtaining a description of at least one device in a docking station from the docking device class circuit. In one embodiment the method further includes but is not limited to controlling the at least one device via commands appropriate to the bus. In one embodiment, circuitry is utilized to effect the foregoing-described method. In addition, a related docking station having a docking device class circuit is described.

20 Claims, 12 Drawing Sheets

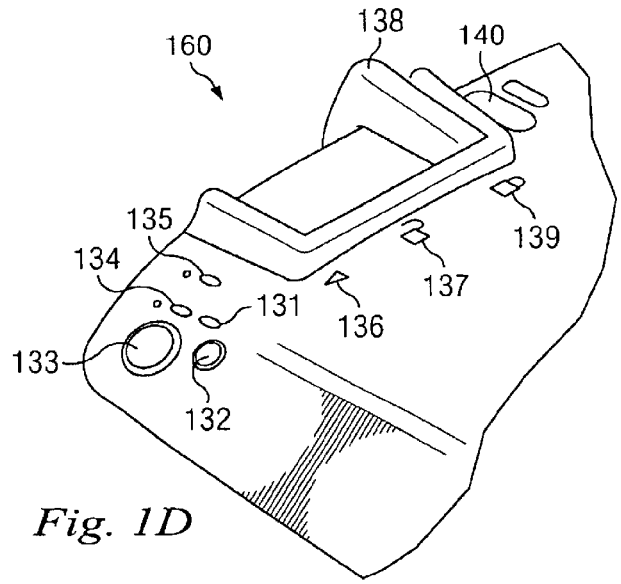

DOCKING DEVICE CLASS CIRCUIT

THE DOCKING DEVICE CLASS CIRCUIT IS A DEVICE (1) WHICH WILL INTERFACE AND FUNCTION WITH A BUS FOR WHICH WELL KNOWN STANDARDS (EITHER DE FACTO OR DE JURE) ARE DEFINED (e.g., USB, PCI, AT, ETC.), AND (2) WHICH CONTAINS WITHIN IT INFORMATION WHICH DEFINES THE AT LEAST ONE SUBSET OF THE "UNIVERSE" OF A DOCKING STATION OF WHICH IT (THE DOCKING DEVICE CLASS CIRCUIT) FORMS A PART, (3) WHICH WILL THEREBY ALLOW IDENTIFICATION AND/OR CONTROL OF THE ONE OR MORE DATA PROCESSING SYSTEM COMPONENTS WHICH MAKE UP AT LEAST ONE SUBSET OF THE UNIVERSE OF THE DOCKING STATION VIA USE OF WELL KNOWN AND WELL-DEFINED FUNCTIONS ASSOCIATED WITH THE BUS WITH WHICH THE DOCKING DEVICE CLASS CIRCUIT IS INTERFACED. THE "UNIVERSE" OF THE DOCKING STATION CAN INCLUDE AD HOC HARDWARE AND SOFTWARE WITHIN THE DOCKING STATION (e.g., A DOCKING-STATION HARD-DRIVE ACCESS LED AND SWITCH/UNDOCK BUTTON), THE BUS STRUCTURES AND ASSOCIATED DEVICES IN THE DOCKING STATION, AND/OR THE POWER SUPPLY TYPES AND/OR VOLTAGES WITHIN THE DOCKING STATION

700

702 — BUS OF KNOWN TYPE, FOR WHICH WELL-DEFINED STANDARDS EXIST. FOR EXAMPLE, USB, PCI, AT, ETC

154 — DOCKING INTERFACE CONNECTOR

*Fig. 7*

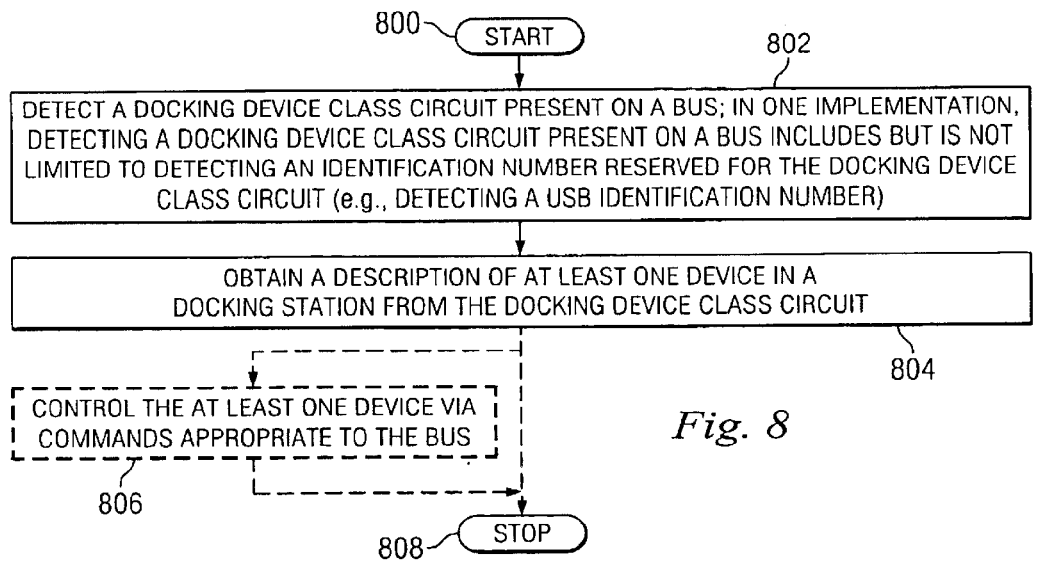
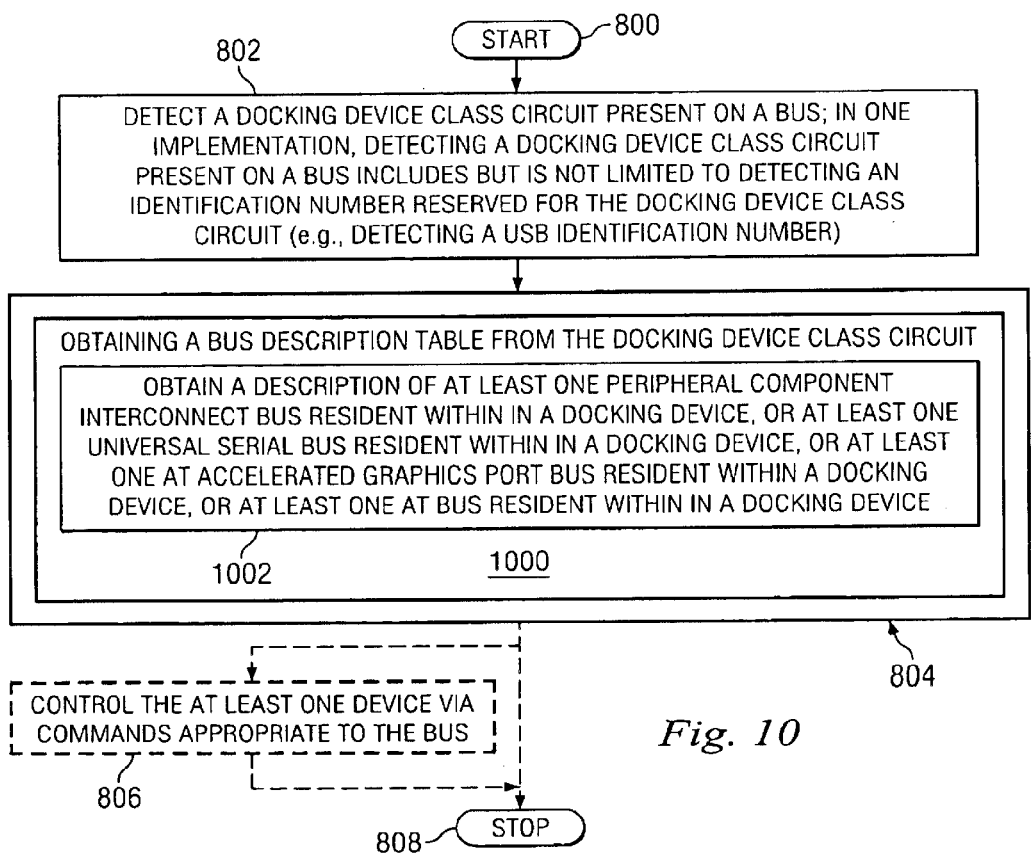

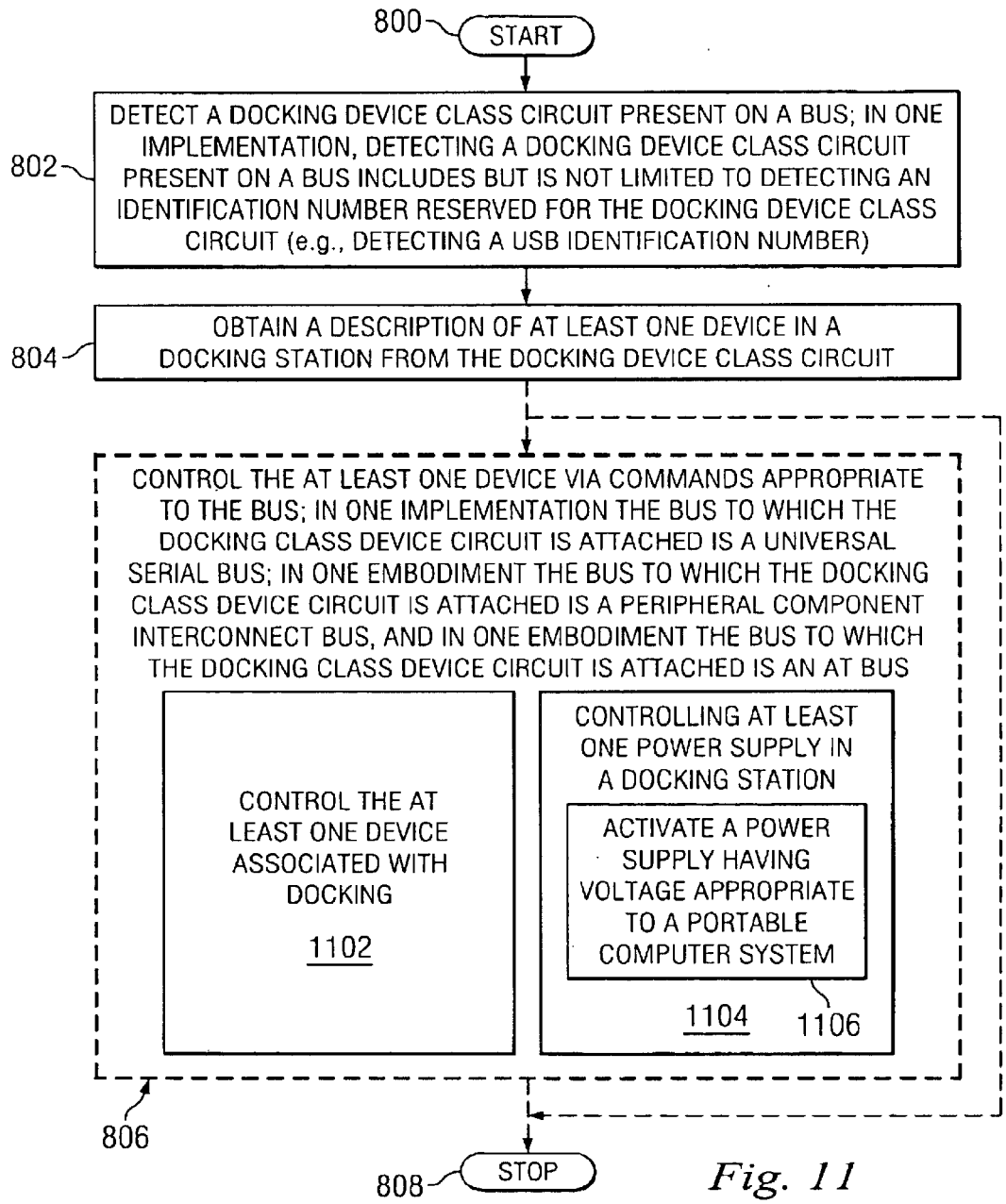

DOCKING STATION FOR USE WITH A PORTABLE COMPUTER SYSTEM

BACKGROUND

Copyright Notice

A portion of the disclosure of this patent document contains material which is subject to copyright protection. With respect to those aspects of this patent document of which the present applicant and/or assignee is the copyright owner, the copyright owner has no objection to the facsimile reproduction by anyone of the patent document or the patent disclosure, as it appears in the Patent and Trademark Office patent file or records, but otherwise reserves all copyright or rights whatsoever.

1. Field of the Invention
2. Description of the Related Art

Data processing systems are systems that manipulate, process, and store data. Personal computer systems constitute well-known examples of data processing systems.

By convention, personal computer systems are typically "classed"—on the basis of size, weight, and portability—as either "stationary" computer systems or "portable" computer systems. "Stationary" computer systems are so classed because of their bulky size and weight. Examples of stationary computer systems are desktop computer workstations—so named due to the fact that, although large, such computer systems can generally be supported by an office desk. Stationary computer systems generally consist of four main components: a computer case, a large CRT monitor, a mouse, and a full-size computer keyboard.

Stationary computer systems tend to be extremely powerful, due in part to the extremely large size of their computer cases. The larger case sizes provide many cubic inches of space into which many powerful computing devices can be placed. In addition, the larger case sizes of stationary computer systems improve cooling properties, and the fact that such computer systems are stationary allows them to be driven with large amounts of AC wall-socket power. Lastly, stationary computer systems can utilize extremely large monitors and full-size keyboards, allowing for very high resolution and ease of use.

"Portable" computer systems are so classed because their size, weight, and construction allows them to be easily (relative to stationary computer systems) transported. A portable computer system almost always has a display screen, mini-keyboard, a mini-pointing device which functions as a mouse, a computer processor and associated memory, and communications device contained in one case. By convention, portable computer systems are subclassed as laptop computer systems (e.g., 10–20 pounds), notebook computers (similar in physical size to a paper notebook, but which usually weigh 5–8 pounds), and subnotebook computers (slightly smaller than notebooks, and which generally weigh 2–5 pounds).

Portable computer systems tend to be have relatively powerful processors, but generally have significantly less power and ease of use than that available with stationary computer systems. Reasons for such lesser power and ease of use are that the smaller cases of portable computer systems do not allow for the same number and size of computing devices which can be present in stationary computer systems, the smaller case sizes do not allow for as effective heat management as available in stationary computer systems, and the fact that the portable computer systems must often run on battery power limits what components portable computer systems can be utilize. In addition, the smaller screen size and mini-keyboards utilized in desktop computer systems generally are less easy to use than their full-size counterparts available in stationary computer systems.

As noted, portable computer systems tend to have relatively powerful processors (generally comparable to mid-range stationary computer systems), but the lack of supporting components tend to make such portable computer systems less powerful and less easy to use than stationary computer systems. In the relatively recent past, original computer manufacturers (OEMs—producers of portable and stationary computer systems) have begun to produce "docking stations," which are used to create hybrid systems which allow portable computer system owners to utilize the relatively powerful processors of their portable computer systems in a stationary computer system environment. It is to be understood that as used herein, the term "docking station(s)" is meant to include all devices in the art recognized to provide docking functions (e.g., the term "docking stations" is meant to include not only devices formally referred to as docking stations but also port replicators, advanced port replicators, docking apparatuses—that is, generally any device recognized to perform some type of docking function).

A docking station is a device in which a portable computer can be "docked"—electrically and logically connected such that the portable computer system can take advantage of additional computational devices either resident in or connected with the docking station. The docking station typically contains slots for expansion cards, bays for storage devices, and connectors for peripheral devices, such as printers and monitors. Once a portable computer system is docked in a docking station, the resulting hybrid system functions essentially as a stationary computer system. Accordingly, docking stations provide the power of stationary computer systems to owners of portable computer systems. In addition, the docking station provides owners of notebook computer systems with the ability to use a full-size keyboard and monitor when the notebook computer is docked.

It is significant for the present discussion that there are no "Standards" for docking stations. A "standard" is a defined way for accomplishing certain tasks. (Standards can be either "de facto" standards (something that has become a standard not because it has been approved by a standards organization, but because it is widely used and recognized by an industry as being standard) or "de jure" standards (standards expressly created by standards-setting bodies expressly for the purpose of establishing the standard)). For example, an electrical standard for docking might specify the currents, voltages, and timing signals associated with docking; a "form factor" standard for docking might define the size and shape of physical connectors to mate two different devices to be docked; and a logical standard (or protocol) for docking might define the logical sequence in which two different functional devices are to exchange information. However, no such docking standards exist in the art.

At present, docking stations are essentially proprietary creations of individual OEMs, which means that consumers can generally only use systems sold by one particular OEM. That is, the fact that no significant docking standards currently exist generally means that consumers must buy a docking station produced by the company that produced the consumers' portable computer systems.

When standards exist, systems can be "open" which means that consumers can "mix and match" among various computer manufactures. When standards do not exist, systems are proprietary. Although counterintuitive, it is preferable for all parties involved that standards exist. Consumers benefit because they are not tied to one particular OEM, and thus market competition exists, thereby making computing devices made under standard more affordable. In addition, counterintutively, it has been found that OEMs benefit in that consumers tend to buy more of computing devices made under standard, and in fact OEMs—even those OEMs who previously had a near-monopoly position—generally tend to sell more product made under standard.

In light of the foregoing, it is apparent that a need exists for a method and system which essentially give rise to an attractive, simple, and competitive way to standardize docking. However, insofar as OEMs have become accustomed to the freedom to innovate currently available under the proprietary systems, it is preferable that the method and system preserve such freedom to innovate.

SUMMARY

The disclosure herein is for a method and system which provide an attractive, simple, and competitive way to standardize docking in such a way that the freedom to innovate currently available under proprietary systems is substantially preserved.

In one embodiment, a method includes but is not limited to detecting a docking device class circuit present on a bus, and obtaining a description of at least one device in a docking station from the docking device class circuit. In one embodiment the method further includes but is not limited to controlling the at least one device via commands appropriate to the bus.

In one embodiment, circuitry is utilized to effect the foregoing-described method. In addition to the foregoing, a related docking station having a docking device class circuit is described.

In one embodiment, a program product includes but is not limited to program code for detecting a docking device class circuit present on a bus, program code for obtaining a description of at least one device in a docking station from the docking device class circuit, and signal bearing media bearing said program code for detecting and said program code for obtaining. In one embodiment the program product further includes but is not limited to the signal bearing media further bearing program code for controlling the at least one device via commands appropriate to the bus.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of this patent invention will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings.

FIG. 1D illustrates a partial perspective view of undocking controls 160 of docking station 150.

FIG. 7 illustrates a high-level logic flowchart of generic docking device class circuit 700.

FIGS. 8–11 are embodiments of high-level logic flowcharts.

The use of the same reference symbols in different drawings indicates similar or identical items.

DETAILED DESCRIPTION

As noted above, the disclosure herein is for a method and system which essentially give rise to a standardized way of docking. The method and system allow the essentially ad hoc way in which docking is currently done to be relatively easily and painlessly converted over to use of one of many pre-existing industry standards. In one implementation, this is done with what will be referred to herein as a docking device class circuit.

Figure 1A:
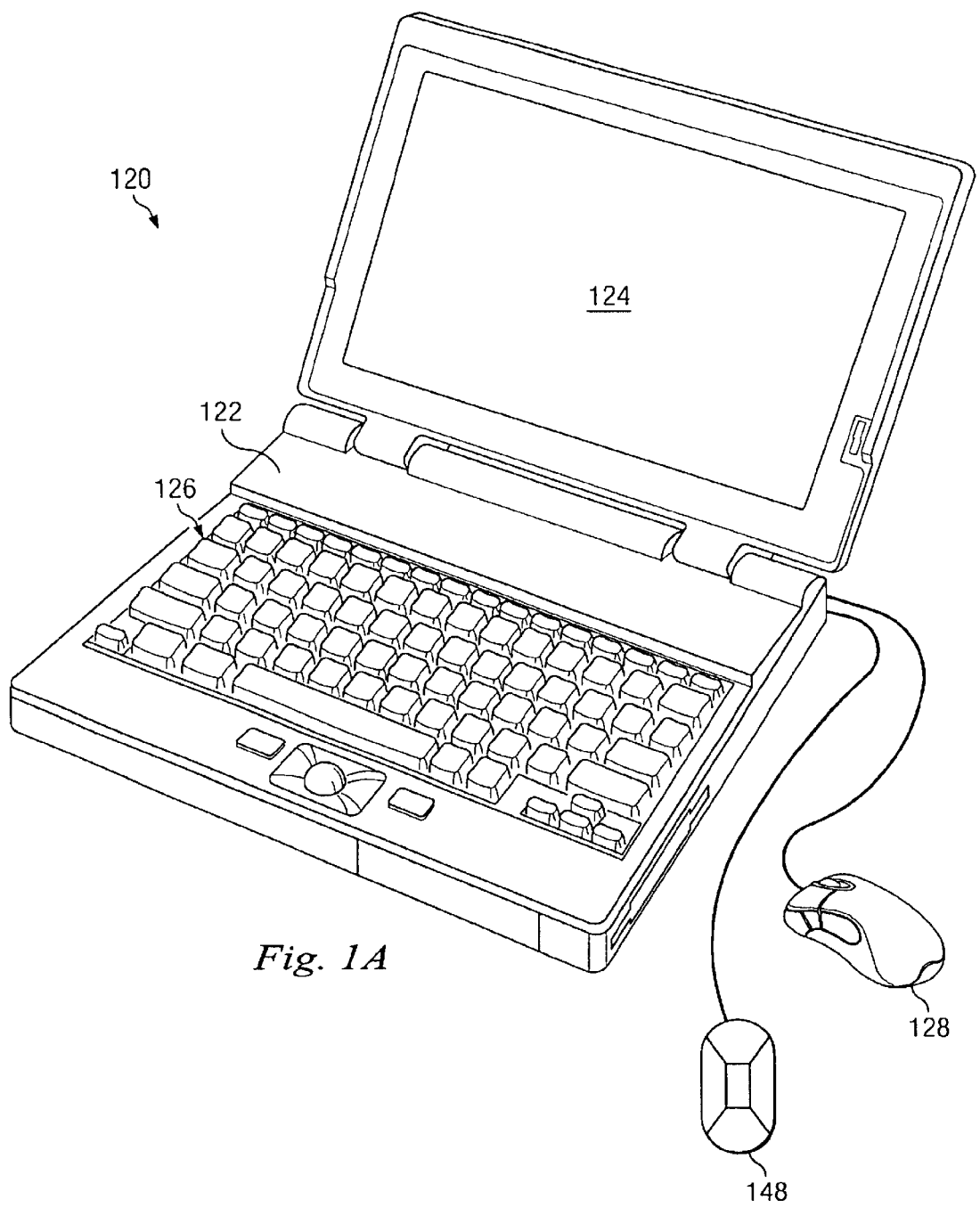
FIG. 1A illustrates a pictorial representation of a conventional data processing system in which illustrative embodiments of the devices and/or processes described herein may be implemented.

With reference to the Figures, and in particular with reference now to FIG. 1A, shown is a pictorial representation of a conventional data processing system in which illustrative embodiments of the devices and/or processes described herein may be implemented. It should be noted that graphical user interface systems (e.g. Microsoft Windows 98 or Microsoft Windows NT operating systems) and methods can be utilized with the data processing system shown in FIG. 1A. Portable computer system 120 (a type of data processing system) is depicted which includes system unit housing 122, video display device 124, keyboard 126, mouse 128, and microphone 148. Portable computer system 120 may be implemented utilizing any suitable computer such as any DELL portable computer system, a product of Dell Computer Corporation, located in Round Rock, Tex.; Dell is a trademark of Dell Computer Corporation.

Figure 1B:
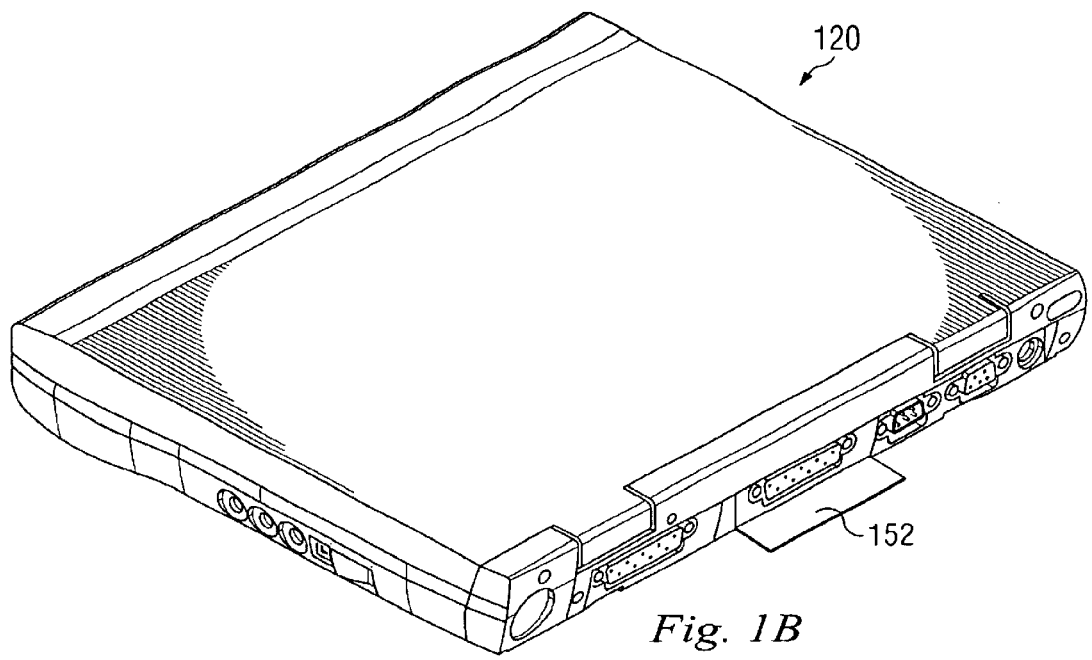
FIGS. 1B and 1C show perspective views of portable computer system 120 and portable computer system 120 in the process of docking with docking station 150.
Figure 1C:
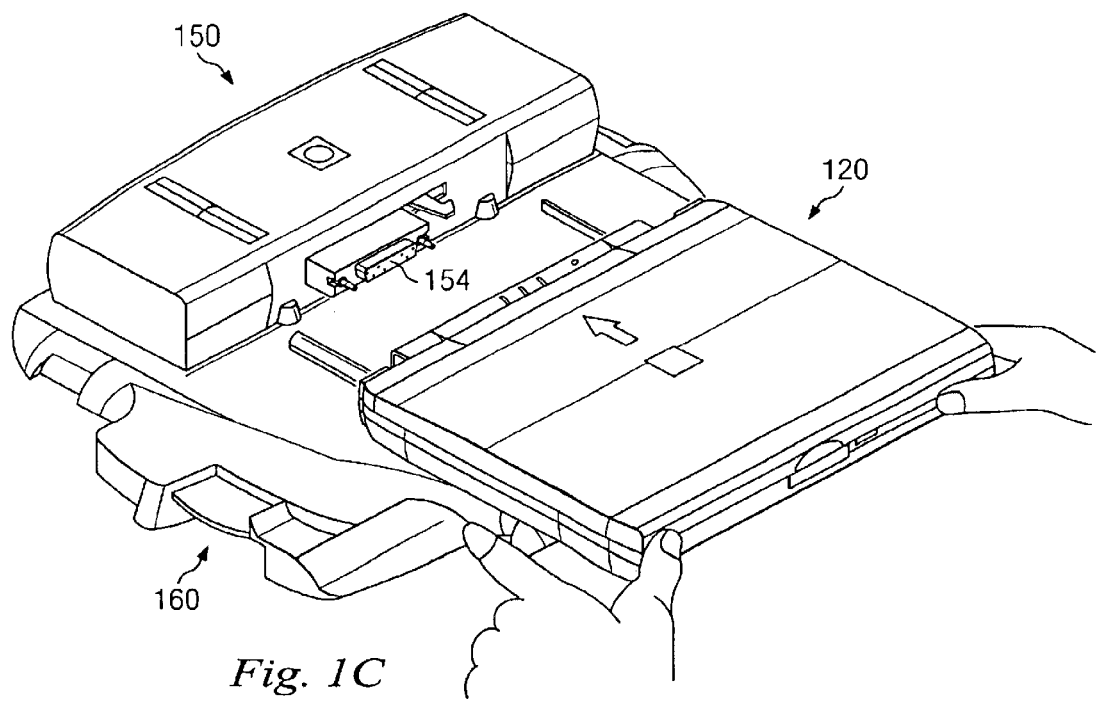

Referring now to FIGS. 1B and 1C, respectively depicted are perspective views of portable computer system 120 and portable computer system 120 in the process of docking with docking station 150. Illustrated in FIG. 1B is that portable computer system 120 has docking connector 152. Shown in FIG. 1C is portable computer system 120 in the process of docking with docking station 150. Depicted is that docking station 150 has docking connector 154 which mates with docking connector 152 of portable computer system 120. While portable computer system 120 can generally be implemented using any portable computer system, docking station 150 must generally be implemented via purchasing a proprietary docking station from the same OEM which sold/produced the portable computer system. This requirement for purchasing the docking station from the same OEM which sold/produced the portable computer system is one problem which aspect of the methods and systems described herein are intended to remedy. For example, if portable computer system 120 is implemented via a Dell portable computer system, typically docking station 150 must be implemented via a Dell docking station.

As noted above, once portable computer system 120 is docked with docking station 150, the hybrid system formed by portable computer system 120 docked with docking station 150 essentially becomes a very powerful system approaching the power of a stationary computer system, such as a stationary workstation. In order to do this, the processor and Operating System (OS) internal to portable data processing system 120 must electrically connect with the data processing system components internal to docking station 150 (usually through pin and socket arrangements (not shown) of docking connector 152 and docking connector 154, respectively) and thereafter become aware of the data processing system components internal to docking station 150. In order to become aware of data processing system components internal to or connected with docking station 150, after portable computer system 150 is docked with docking station 150, the BIOS and/or OS internal to portable computer system 120 must search out and become aware of the data processing system components internal to or connected with docking station 150. This searching out and becoming aware of the data processing system components internal to or connected with docking station 150 takes a considerable amount of time, and one advantage of the methods and systems described herein is to decrease the time associated with the searching out and becoming aware of performed by the BIOS and/or OS of portable computer system 120.

Once portable computer system 120 has become aware of the data processing system components within docking station 150, the hybrid system formed by portable computer system 120 docked with docking station 150 functions seamlessly as a single data processing system. For example, during operation, portable computer system 120 may be executing a program using RAM (random access memory) resident within portable computer system 120 and communicating via a NIC (network interface card) resident within docking station 150. In order to ensure that users do not inadvertently undock portable computer system 120 from docking station 150 during a period of time in which portable computer system 120 and docking station 150 are functioning as a hybrid computer system, elaborate electrical and mechanical controls have been developed within the art. Mechanisms for accomplishing this include systems of LEDs and mechanical levers to alert the user as to when it is safe to undock, and servo-mechanisms which will only release portable computer system 120 when the system decides it is safe to undock.

With reference now to FIG. 1D, shown is a partial perspective view of undocking controls 160 of docking station 150. Depicted are docking indicator LED 131, switch/undock button 132, docking station power button 133, docking station power indicator LED 134, docking station hard-drive-access LED 135, eject/locking lever 138 which is shown having locked position 139, unlocked position 137, and eject position 136. In some embodiments, eject/locking lever 138 is manipulated manually, while in other embodiments servo-mechanisms under the control of portable computer system 120 by and through electrical connection with docking station 150, control eject/locking lever 138. Further shown is audio speaker 140, which in some implementations alerts the user to whether it is safe to undock portable computer system 120. Those skilled in the art will recognize that docking controls 160 are merely exemplary and that many other similar implementations are known in the art.

Figure 2:
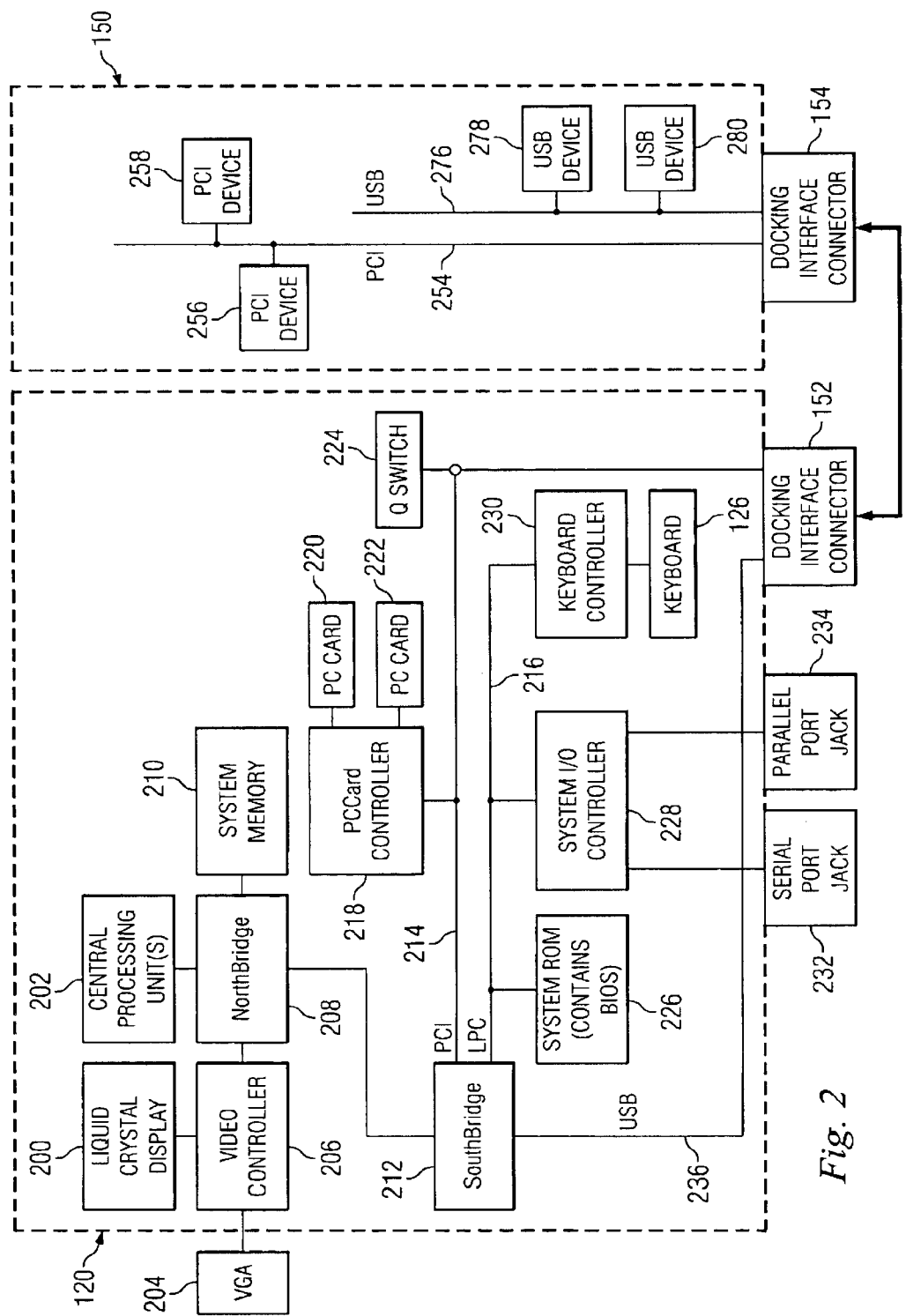
FIG. 2 depicts a representative high-level block diagram of a portion of the electrical components internal to both portable data processing system 120 and docking station 150.

Referring now to FIG. 2, depicted is a representative high-level block diagram of a portion of the electrical components internal to both portable data processing system 120 and docking station 150. Those skilled in the art will recognize that the block diagram of FIG. 2 is merely exemplary, and many other different components may be present.

Depicted are Liquid Crystal Display 200, Central Processing Unit(s) 202, VGA jack 204, Video Controller 206, Northbridge 208, System Memory 210, and Southbridge 212 interfaced and connected in a way well known to those within the art. Illustrated is that Southbridge 212 is interfaced with PCI (Peripheral Component Interconnect) bus 214, LPC (Low Pin Count) I/O bus 216, and USB (Universal Serial Bus) 236. (Note: Those skilled in the art will appreciate that, ordinarily, only one device is attached per USB, and that if more than one device is to be attached to a USB, a USB hub is used to provide for such additional devices. Accordingly, where multiple devices are herein shown attached to a USB, if a USB hub is not explicitly shown it is to be understood that such a hub is implicitly present.)

Shown is that PCI bus 214 has attached to it PC card controller 218 (which is intended to be an example of any type of PCI device attachable to PCI bus 214). Depicted is that PC Card controller 218 interfaces with and controls both PC Card 220 and PC Card 222. Illustrated is that associated with PCI bus 214 is Q Switch 224 which is either activated or deactivated in response to docking operations.

Further shown is that LPC I/O bus 216 is interfaced with System ROM (Read Only Memory) 226 which in one embodiment contains the system BIOS (Basic Input Output System) firmware, System I/O Controller 228, and Keyboard Controller 230. Depicted is that system I/O controller 228 is connected with serial port jack 232 and parallel port jack 234.

Depicted is that both PCI bus (through Q Switch 224) and USB 236 electrically connect with docking connector 152. Illustrated is that docking connector 152 mates with docking connector 154 such that PCI bus 214 and USB 236, both internal to portable computer system 120, are respectively electrically connected with PCI bus 254 and USB 276, both of which are internal to docking station 150. Illustrated are PCI devices 258, 258 connected with PCI bus 254. Shown are USB devices 278, 280 connects with USB 276.

In normal operation, when portable computer system 120 is docked with docking station 150, PCI bus 254 (and its attached devices) and USB bus 276 (and its attached devices) are detected by the BIOS and/or OS of portable computer system 120, and thereafter are used part and parcel by portable computer system 120 "as if" such components in docking station 150 were in fact part of portable computer system 120. Those skilled in the art will recognize that the foregoing described method of operation is generally described as "pass through." Those skilled in art will recognize that the processes by which the BIOS and/or the OS of portable computer system 120 become aware of busses and/or devices resident within docking station 150 can become quite time consuming and complex, depending upon the way in which the busses, and their associated devices, internal to docking station 150 are structured. The methods and systems described herein decrease the time and complexity associated with such operations in a manner which will be described below.

As noted above, there is no standard defining docking. Those skilled in the art will appreciate that one of the main reasons why no such standard exists is that there is no easy way to accommodate all the various processes and devices by which OEMs in the related art achieve the "details" or "ad hoc" functions/tasks associated with docking (e.g., the functions and tasks associated with one or more of docking controls 160 described in relation to FIG. 1D). Following is a description of a few such ad hoc functions/tasks (those skilled in the art will recognize that there are many more ad hoc functions than those described herein), and a way to allow the OEMs to continue practicing the details in whatever fashion they choose, while allowing such free-form ad hoc functions to be detected and controlled in a standardized way which will translate across systems and platforms.

Figure 3:
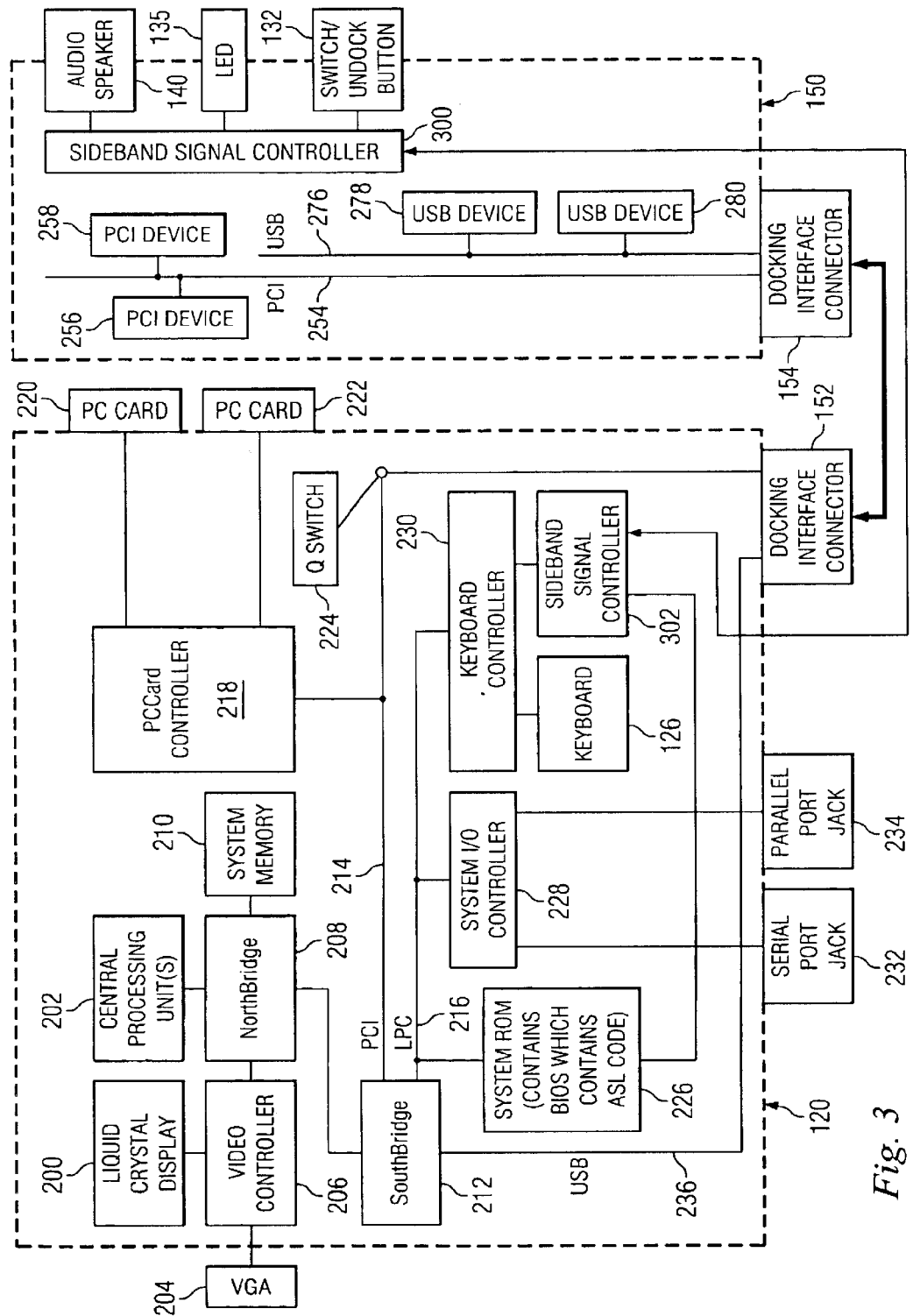
FIG. 3 shows a system similar to that shown in FIG. 2, except that shown are additional components related to "ad hoc" tasks and/or functions associated with docking and/or undocking portable computer system 120 to/from docking station 150.

With reference now to FIG. 3, shown is a system similar to that shown in FIG. 2, except that shown are additional components related to "ad hoc" tasks/functions associated with docking and/or undocking portable computer system 120 to/from docking station 150. Depicted is that docking station 150 now has resident within it sideband signal controller 300 (those skilled in the art will recognize that ad hoc functions associated with docking are generally referred to as "sideband" functions/tasks, since such functions/tasks are outside of any defined recognized standard), which controls audio speaker 140, docking station hard-drive-access LED 135, and switch/undock button 132. Illustrated is that docking connector 152 mated with docking connector 154 provides electrical connection between sideband signal controller 300 and its counterpart, sideband signal controller 302, resident within portable computer system 120.

Shown is that sideband signal controller 302 is under the control of keyboard controller 230—however, those skilled in the art will recognize other implementations are possible: there is no defined standard way to accommodate ad hoc docking station functions/tasks. Depicted is that sideband signal controller 302 is in communication with system ROM 226, from which sideband signal controller 302 retrieves ASL (ACPI Source Language) code.

Those skilled in the art will recognize that, since there is currently no standardized way to account for devices, related to ad hoc functions/tasks, that may be present in docking station 150, it is generally necessary in the art to actually know beforehand what devices will most likely be present in docking station 150, and hence hard-code the commands for such known-beforehand devices into system ROM 226. Thereafter, when sideband signal controller 302 needs to issue a command to a device through sideband signal controller 300, sideband controller 302 retrieves the ASL code from the system BIOS in system ROM 226 and uses such ASL code to communicate with the device to which commands are to be issued. (Note: those skilled in the art will appreciate that in actual operation, the sideband controller actually works with the OS which (1) fetches the ASL code from BIOS, (2) interprets the ASL code, (3) creates commands and routines in response to the interpretation of the ASL code, and (4) supplies the sideband controller with the created commands and routines; however, for sake of ease of understanding, the foregoing sequence is referred to herein as the sideband controller retrieving the ASL code.)

Those skilled in art will recognize that the necessity to hard-code the ASL code into the system BIOS is a tremendous disadvantage, and tends to make docking stations relatively inflexible. It certainly makes it virtually impossible to provide open-systems docking across multiple OEMs, and even makes it difficult to provide cross-system compatibility between various systems made by the same OEM. However, OEMs have become attached to the flexibility, power, and competitive advantage attached to the ad hoc way of docking. Consequently, it is apparent that if open-systems docking is ever to be achieved, such must be accomplished via methods and systems which preserve the flexibility, power, and competitive advantage attached to the ad hoc way of docking. Methods and systems which accomplish the foregoing will now be described.

Figure 4:
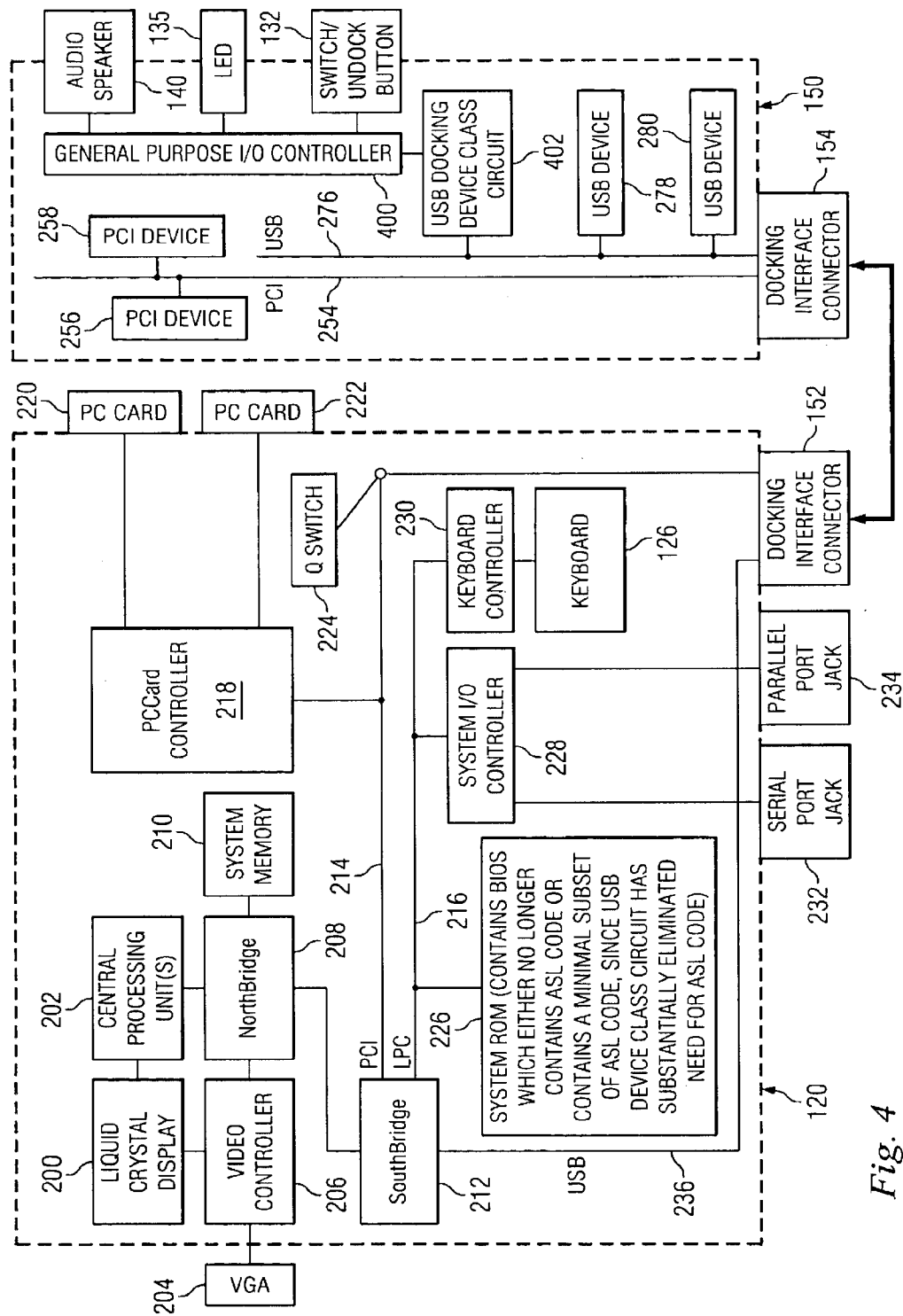
FIG. 4 illustrates a system similar to that shown in FIG. 3, except that shown is that a large portion of the additional components related to "ad hoc" tasks and/or functions associated with docking and/or undocking portable computer system 120 to/from docking station 150 have been replaced with a scheme which utilizes a bus with well-defined characteristics.

Referring now to FIG. 4, depicted is a system similar to that shown in FIG. 3, except that shown is that a large portion of the additional components related to "ad hoc" tasks and/or functions associated with docking and/or undocking portable computer system 120 to/from docking station 150 have been replaced with a scheme which utilizes a bus with well-defined characteristics (e.g., a USB in the scheme shown in FIG. 4, but those skilled in the art will recognize that other well-defined bus types can be used). Shown in FIG. 4 is that, while audio speaker 140, docking station hard-drive-access LED 135, and switch/undock button 132 as described in FIG. 3 are still present, sideband controllers 300, 302, and a majority of the ASL code describing devices related to ad hoc functions/tasks related to docking are no longer present (e.g., in one implementation, a minimal subset of ASL code which describes USB docking device class circuit 402 is present in the BIOS). Instead, shown is that audio speaker 140, docking station hard-drive-access LED 135, and switch/undock button 132 are now interfaced with and controlled by general purpose I/O controller 400. General purpose I/O controller 400 is intended to be indicative of devices control and/or interact with input devices, or output devices, or both input devices and output devices.

Depicted is that general purpose I/O controller 400 is interfaced with and controlled by USB Docking Device Class Circuit 402. Illustrated is that USB Docking Device Class Circuit 402 is attached to USB 276.

In operation, during system initialization, the BIOS and/or OS of portable computer system 120 detects the presence of USB docking device class circuit 402. In one implementation, the detection of USB docking device class circuit 402 is done via the detection of a USB identification number specifically associated with USB docking device class circuit 402; in one implementation the foregoing is established via an unassigned USB identifier, but it is expected that at some point in the future by either the USB Implementation Forum, Inc. (a non-profit corporation founded by the group of companies that developed the USB specification, with a physical presence in Portland, Oreg., and a Web presence at the following URL: http://www.usb.org/info.html) or the docking station industry generally will actually define a specific USB identification number specifically associated with USB Docking Device Class Circuit 402.

Once the BIOS and/or OS of portable computer system 120 detects the presence of USB docking device class circuit 402, the BIOS and/or OS of portable computer system 120 queries USB docking device class circuit 402 as to the devices necessary to the ad hoc functions/tasks associated with docking. In response, the BIOS and/or OS of portable computer system 120 detects the presence of USB docking device class circuit 402, and provides the BIOS and/or OS with the ACPI tables necessary to define interaction with such devices. (For background information related to ACPI related to docking, one good reference manual is Microsoft Corporation's ACPI Docking for Windows 2000, DRAFT VERSION 0.7 (Dec. 21, 1998), hereby incorporated by reference in its entirety; and USB Specifications 1.1 and 2.0, available from the USB Implementers Forum of Portland, Oreg. and/or the following link: http://www.usb.org), hereby incorporated by reference in their entireties. In addition to the foregoing, both Microsoft Corporation and Intel Corporation both maintain web sites which provide very substantial background material related to ACPI, USB, docking, and other background issues which may prove useful to those skilled in the art. It is to be under stood that any and all of the references referred to or cited herein are hereby incorporated by reference in their entireties.) Thereafter, the BIOS and/or OS of portable computer system 120 retrieves the driver code for the detected devices; in one implementation, such retrieval is from disk storage on-board portable computer system 120, while in another implementation, such retrieval is done from a storage device (e.g., a hard disk drive) within docking station 150.

Once the BIOS and/or OS of portable computer system 120 has become aware of and has been supplied the appropriate ACPI tables defining ad hoc devices such as audio speaker 140, docking station hard-drive-access LED 135, and switch/undock button 132, portable computer system 120 can then, by and through USB docking device class circuit 402, control such ad hoc devices through standard programming commands associated with USB devices. Accordingly, the scheme shown and described in relation to FIG. 4 allows standardized control and recognition of devices associated with ad hoc functions/tasks associated with docking operations, without limiting the freedom of OEMs to use virtually any approach whatsoever with respect to the ad hoc functions and tasks employed or the devices used to effect same. That is, OEMs can attach virtually any device they so desire to general purpose I/O controller 400.

Those skilled in the art will recognize that in addition or in the alternative to the problems associated with detecting and controlling devices associated with ad hoc functions/tasks related to docking, other problems, related to power supplies, arise in the context of docking. Specifically, some portable computer system OEMs utilize 12 volt power supplies, while others utilize 18 volt power supplies, while still others utilize 24 volt power supplies. Because it is common and substantially preferable in the art to provide power to portable computer system 120 by and through docking station 150 (e.g., via use of docking station power button 133), in order to provide true open-systems docking, it is desirable to allow the same docking station to provide power to a variety of portable computer systems employing a variety of power schemes. USB Docking Device Class Circuit 402 provides such capability.

Figure 5:
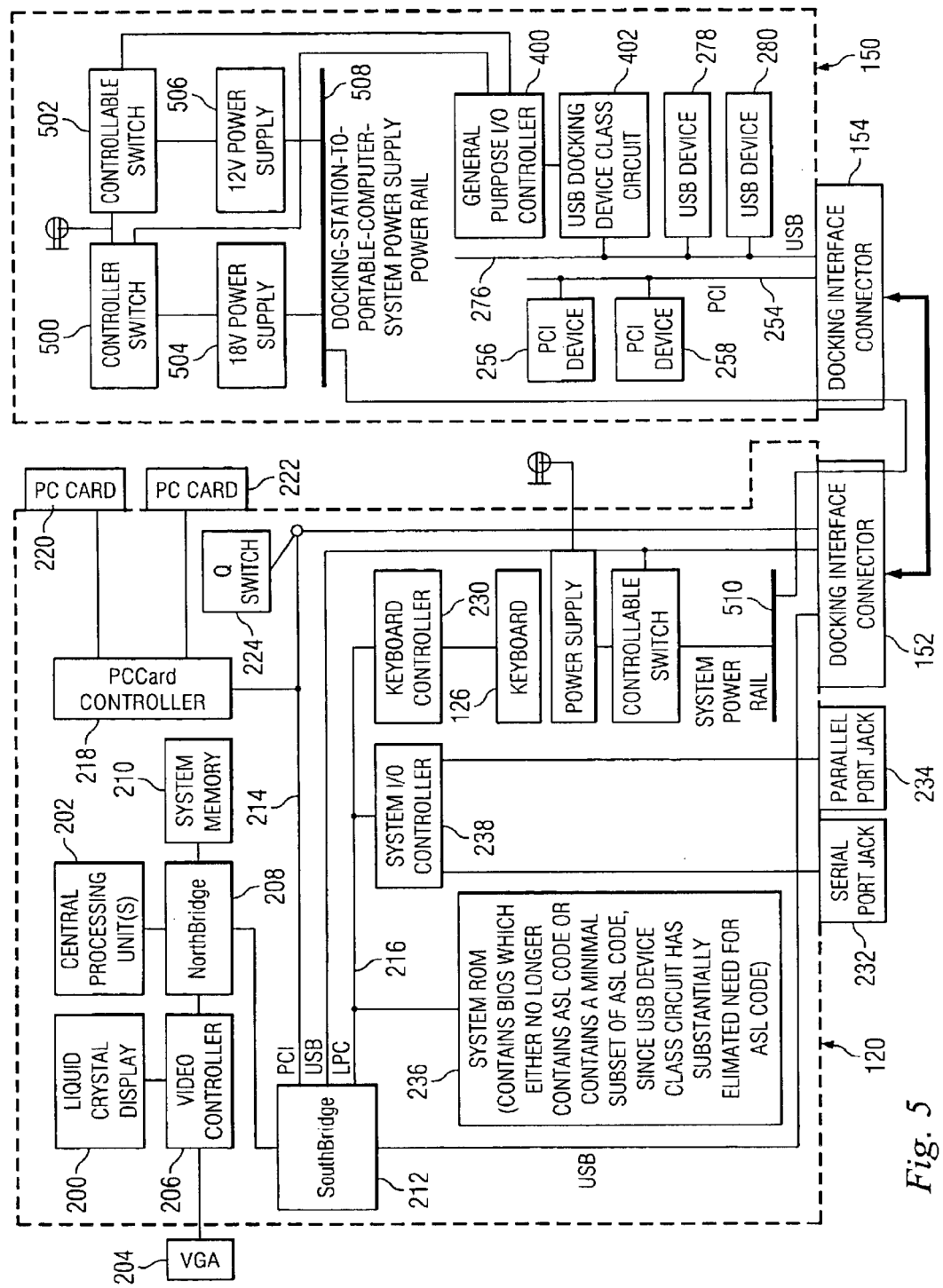
FIG. 5 depicts a system similar to that shown in FIG. 4, wherein general purpose I/O controller 400 is shown controlling controllable switches 500, 502.

With reference now to FIG. 5, depicted is a system similar to that shown in FIG. 4, wherein general purpose I/O controller 400 is shown controlling controllable switches 500 and 502. Controllable switches 500 and 502 control which of 18 volt power supply 504 or 12 volt power supply 506 respectively drive docking-station-to-portable-computer system power rail 508. (Those skilled in the art will appreciate that controllable switches 500, 502, and 18 volt power supply 504, and 12 volt power supply 506 are exemplary only and that other switching devices (e.g., muxes) and power supplies (e.g., a 24 volt supply) can be utilized under the spirit of the teaching herein.)

The BIOS and/or OS of portable computer system 120 becomes aware of controllable switches 500, 502, and 18 volt power supply 504, and 12 volt power supply 506 through USB docking device class circuit 402 via a process analogous to that described previously (e.g., the BIOS and/or OS becoming aware of USB docking device class circuit 402, and thereafter obtaining information of the devices under the control of USB docking device class circuit 402 (which in one implementation controls such devices through general purpose I/O controller 400)). After BIOS and/or OS of portable computer system 120 determines the power supplies available, portable computer system 120 can issue commands, through USB docking device class circuit 402, to ensure that the power supply driving docking-station-to-portable-computer system power rail 508—which is shown electrically connected with portable-computer-system power rail 510 through docking connector 152 coupled with docking connector 154—is the power supply appropriate to portable computer system 120. Thus, docking device class circuit 402 can provide docking stations with the ability to interface with portable computer systems having different power supply requirements.

It was mentioned above that determining the bus structure internal to docking station 150 can be time consuming and complex. In one implementation, USB Docking Device Class Circuit 400 decreases such time and complexity.

Figure 6A:
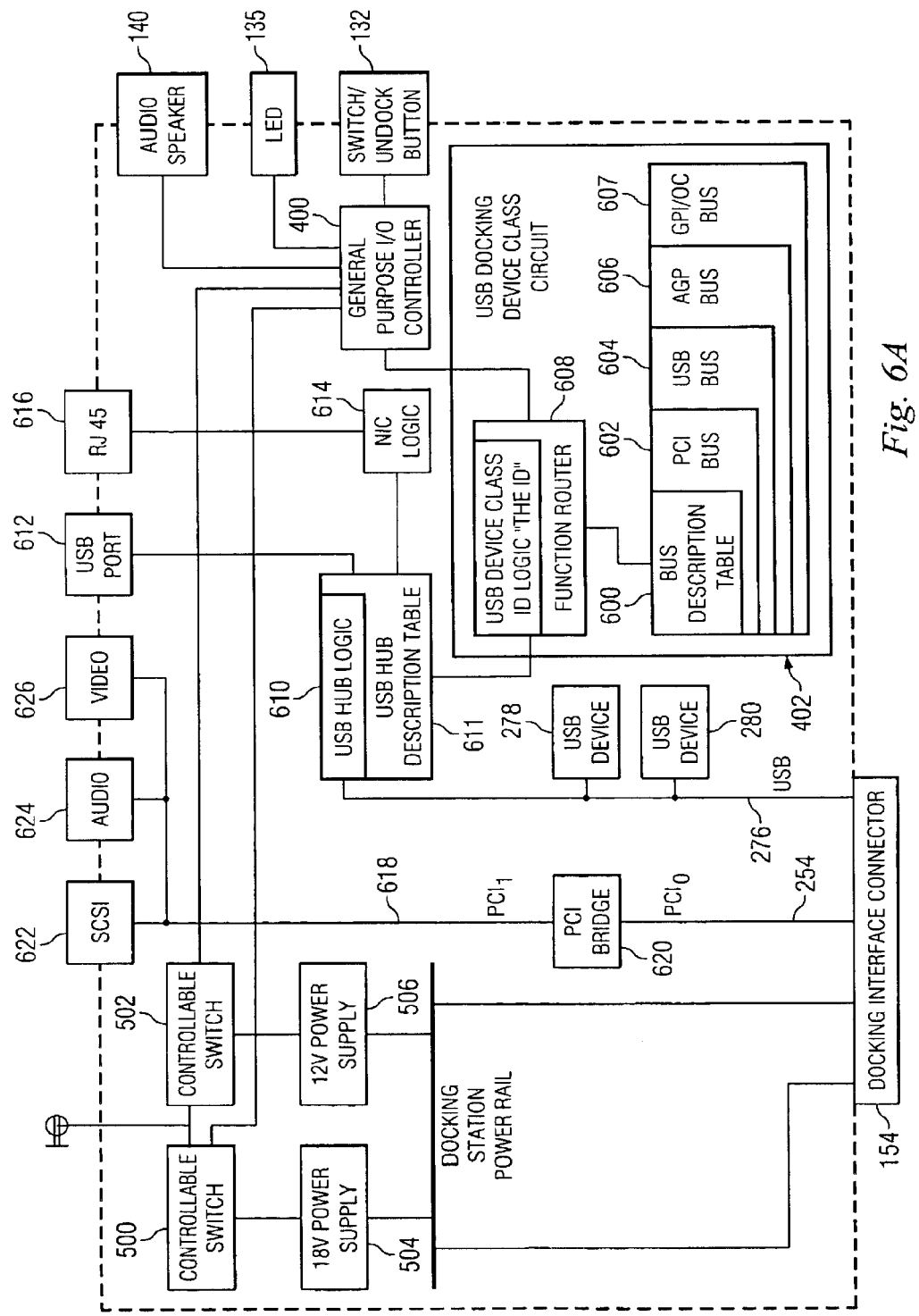
FIG. 6A shows an isolated expanded view of some exemplary components internal to docking station 150.

Referring now to FIG. 6A, shown is an isolated expanded view of some exemplary components internal to docking station 150. Shown is that in one implementation, in addition or in the alternative to the functions of USB Docking Device Class Circuit 402 described in relation to FIGS. 4 and 5, USB Docking Device Class Circuit 402 is further shown having bus description table 600. Bus description table 600 is shown having PCI bus description 602, USB description 604, AGP bus description 606, and GPI/OC (General Purpose I/O Controller 402) bus description 607. PCI bus description 602, USB description 604, AGP bus description 606, and GPI/OC bus description 607 describe the devices attached to their respectively identified busses. Accordingly, BIOS and/or OS of portable computer system 120 can obtain information about the internal structure of docking station 150 without going through the lengthy discovery process existing in the related art. In one implementation, the docking device administrator programs bus description table 600 with information representative of the bus structure of docking device 150, while in another implementation, docking device class circuit 402 polls and logs the configuration of the bus structure of docking device 150 in a fashion analogous to the way in which portable computer system 120 determines such information in the related art.

Insofar as USB Docking Device Class Circuit 402 is now performing additional functions beyond those described in FIGS. 4 and 5, depicted is that USB Docking Device Class Circuit 402 now has internal to it function router 608, which appropriately routes messages to either general purpose I/O controller 400 or bus description table 600. Lastly, shown is that interposed between USB Docking Device Class Circuit 402 and USB 276 is USB hub logic 610, which is used to show one of the more powerful implementations of a system utilizing some of the advantages of USB Docking Device Class Circuit 402. Depicted attached to USB hub logic 610 are USB port 612 and NIC Logic 614. Illustrated attached to NIC Logic 614 is RJ 45 connector 616.

Also shown is that USB hub logic 610 has USB hub description table 611, which allows USB docking device class circuit 402 to be identified as an "internal" port USB device. This is an indication that the port associated with the USB docking device class circuit 402 is not an external port providing pluggable access to the user. This implementation allows the OS to be more efficient in managing USB docking device class circuit 402.

Further shown in FIG. 6A is that PCI bus 254 is now enumerated as $PCI_0$ bus 254, which is bridged to $PCI_1$ bus 618 through PCI bridge 620. Depicted attached to $PCI_1$ bus 618 are SCSI (Small Computer System Interface) 622, audio card 624, and video card 626. Those skilled in the art will recognize that detecting and enumerating bridged busses—and their attached devices—internal to docking station 150 (e.g., similar to $PCI_0$ bus 254 bridged to $PCI_1$ bus 618) is a very vexing problem in the related art. However, the presence of bus description table 600 within the confines of USB Docking Device Class Circuit 402 allow such information to be garnered in a quick and efficient fashion without engaging in the time consuming and complex processes necessary to detect and enumerate such busses under the related art. As an additional point, enhancements to controlling the PCI bus can be gained by the use of bus description table 600. As an example, the compatibility bus (e.g., $PCI_0$) could be swapped with $PCI_1$ should the designer desire to swap the compatibility bus between docking station 150 and portable computer system 120.

Figure 6B:
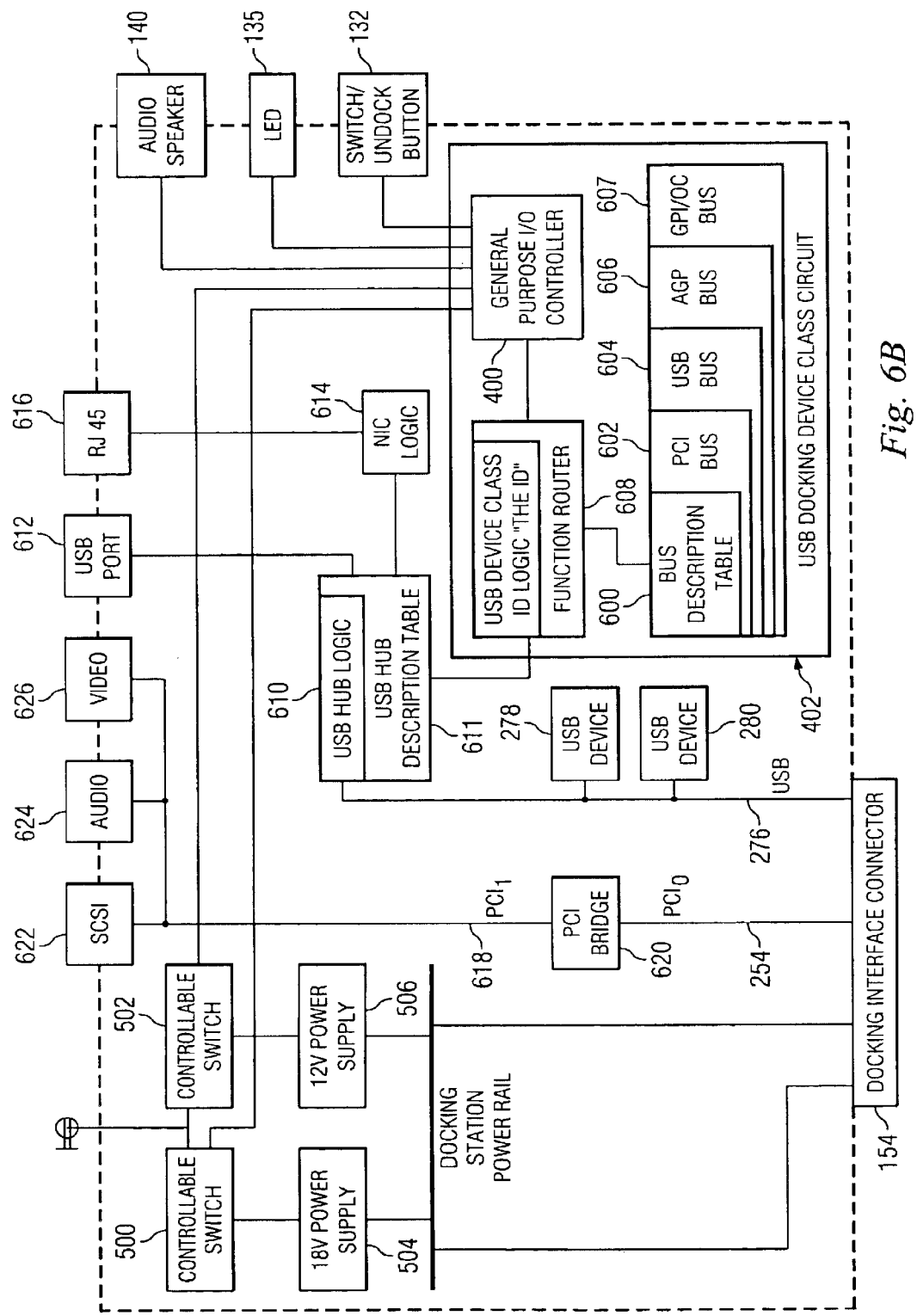
FIG. 6B illustrates an alternate embodiment of USB docking device class circuit 402 which locates general purpose I/O controller 400 internal to USB docking device class circuit 402.

Referring now to FIG. 6B, shown is an alternate embodiment of USB docking device class circuit 402 which locates general purpose I/O controller 400 internal to USB docking device class circuit 402. In general, such an alternate embodiment can also be applied to substantially any embodiment of USB docking device class circuit 402 described herein (e.g., the embodiments described in relation to FIGS. 4 and 5).

With reference now to FIG. 7, shown is a high level logic flowchart of generic docking device class circuit 700. Generic docking device class circuit 700 is intended to illustrate that USB docking device class circuit 402 is illustrative of a more general type of docking device class circuit which can be attached to buses other than USB. As illustrated in FIG. 7, docking device class circuit 700 is a device: (1) which will interface and function with a bus for which well known standards (either de facto or de jure) are defined (e.g., USB, PCI, AT, etc.), and (2) which contains within it information which defines at least one subset of the "universe" of the docking station of which it (the docking device class circuit) forms a part, and (3) which will thereby allow identification and/or control of one or more data processing system components which make up the at least one subset of the universe of the docking station via use of well known and well defined functions associated with the bus with which the docking device class circuit is interfaced. The "universe" of the docking station can include but is not limited to ad hoc hardware and software within the docking station (e.g., docking-station hard-drive access LED 135, and switch/undock button 132), the bus structures and associated devices in the docking station, and/or the power supply types and/or voltages within the docking station. Illustrated is that generic docking device class circuit 700 interfaces with docking connector 154 through a bus of known type 702.

Referring now to FIG. 8, shown is a high-level logic flowchart. Method step 800 shows the start of the process. Method step 802 depicts the step of detecting a docking device class circuit present on a bus; in one implementation, the step (method step 802) of detecting a docking device class circuit present on a bus includes but is not limited to the sub-step of detecting an identification number reserved for the docking device class circuit (e.g., detecting a USB identification number as described herein). Method step 804 illustrates the step of obtaining a description of at least one device in a docking station from the docking device class circuit. Method step 806 shows the (optional) step of controlling the at least one device via commands appropriate to the bus. (Method step 806 is shown as an optional step because in one embodiment the information obtained is that of bus structure internal to a docking device, and thus the commands issued can be on a bus other than the bus to which the docking class device circuit is attached.) Method step 808 depicts the end of the process.

Figure 9:
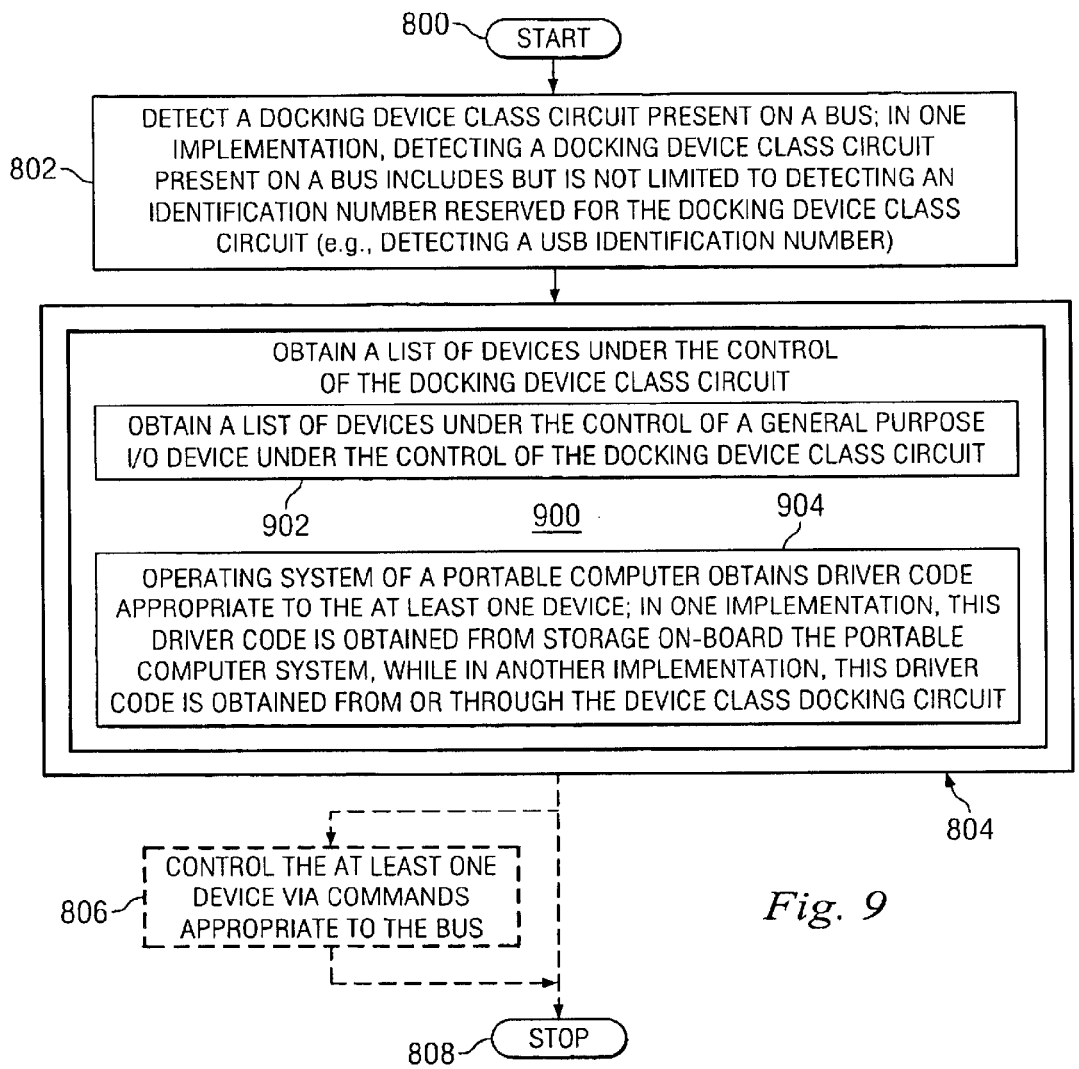

With reference now to FIG. 9, shown is that in one implementation, the step (method step 804) of obtaining a description of at least one device in a docking station from the docking device class circuit includes but is not limited to the sub-step (method step 900) of obtaining a list of devices under the control of the docking device class circuit. Depicted is that in one implementation, the sub-step (method step 900) of obtaining a list of devices under the control of the docking device class circuit includes but is not limited to the sub-step (method step 902) of obtaining a list of devices under the control of a general purpose I/O device under the control of the docking device class circuit. Illustrated is that in one implementation, the sub-step (method step 900) of obtaining a list of devices under the control of the docking device class circuit includes but is not limited to the sub-step (method step 904) of an OS of a portable computer system obtaining driver code appropriate to the at least one device (or, alternatively, the driver code appropriate to the device class docking circuit can be obtained); in one implementation, the driver code is obtained from storage on-board the portable computer system, while in another implementation, the driver code is obtained from or through the device class docking circuit (e.g., driver code for the device class docking circuit can be obtained from the device class docking circuit, driver code for devices can be obtained from the device class docking circuit, or driver code for the devices can be obtained from the devices themselves through the device class docking circuit).

With reference now to FIG. 10, shown is that in one embodiment, the step (method step 804) of obtaining a description of at least one device in a docking station from the docking device class circuit includes but is not limited to the sub-step (method step 1000) of obtaining a bus description table from the docking device class circuit. Depicted is that in one embodiment, the sub-step (method step 1000) of obtaining a bus description table from the docking device class circuit includes but is not limited to the sub-step (method step 1002) of obtaining a description of at least one Peripheral Component Interconnect bus resident within a docking device, or at least one Universal Serial Bus resident within a docking device, or at least one Accelerated Graphics Port Bus resident within a docking device, or at least one AT bus resident within a docking device, or at least one proprietary bus resident within a docking device, or at least one wireless bus resident within a docking device, or at least one optical bus resident within a docking device.

With reference now to FIG. 11, depicted is that with respect to the (optional) step (method step 806) of controlling the at least one device via commands appropriate to the bus, in one implementation the bus to which the docking class device circuit is attached is a Universal Serial Bus; in one embodiment the bus to which the docking class device circuit is attached is a Peripheral Component Interconnect bus, and in one embodiment the bus to which the docking class device circuit is attached is an AT bus. Illustrated is that, in one implementation, the step (method step 806) of controlling the at least one device via commands appropriate to the bus includes but is not limited to the sub-step (method step 1102) of controlling at least one device associated with docking. Shown is that, in one implementation, the sub-step (method step 1102) of controlling the at least one device via commands appropriate to the bus includes but is not limited to the sub-step (1104) of controlling at least one power supply in a docking station. Depicted is that, in one implementation, the sub-step (method step 1104) of controlling at least one power supply in a docking station includes but is not limited to the sub-step (method step 1106) of activating a power supply having voltage appropriate to a portable computer system.

Those skilled in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the devices and/or processes described herein may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the devices and/or processes described herein are capable of being distributed as a program product in a variety of forms, and that an illustrative embodiment of the devices and/or processes described herein applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

Those skilled in the art will recognize that it is common within the art to describe devices and/or processes in the fashion set forth above, and thereafter use standard engineering practices to integrate such described devices and/or processes into data processing systems. That is, the devices and/or processes described above can be integrated into data processing system via a reasonable amount of experimentation. FIGS. 1A–1D show an example representation of a data processing system into which the described devices and/or processes may be implemented with a reasonable amount of experimentation.

Those skilled in the art will appreciate that the hardware depicted in FIGS. 1A–1D may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that portable computer system 120 can be described in relation to data processing systems which perform essentially the same functions, irrespective of architectures. Consequently, as used herein specific exemplars of data processing systems and data processing system components are intended to be representative of their more general types.

Those skilled in the art will recognize that data processing system 120 can be described in relation to data processing systems which perform essentially the same functions, irrespective of architectures.

Although many components are shown herein as electrically connected, it is to be understood that alternate embodiments of such connections are contemplated which can be either wireless or optical connections via the addition of a relatively minor amount of circuitry which can be achieved, without undue experimentation, by those having ordinary skill in the art. As a more specific example, substantially any bus described herein could be replaced by an optical or wireless bus.

Although the examples used herein have shown docking accomplished via use of LPC bus 216, those skilled in the art will recognize that the use of such bus is merely exemplary, and that other implementations fall within the spirit of the teaching herein. For example, docking can be done through a PCI bus, or directly though a Southbridge, or via use of a proprietary bus, etc.

Other embodiments are within the following claims.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the devices and/or processes described herein have been shown and described; it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure. Furthermore, it is to be understood that the disclosure is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements.)

What is claimed is:

1. A method comprising:
   detecting, by a portable computer system, a docking device class circuit present on a bus connecting a docking station to the portable computer system; and
   obtaining by the portable computer system, a description of at least one device in the docking station from the docking device class circuit by obtaining a list of devices under the control of the docking device class circuit, wherein the obtaining of the list of devices includes obtaining the list of devices under the control of a general purpose I/O device under the control of the docking device class circuit.

2. The method of claim 1, further comprising:
   controlling the at least one device via commands appropriate to the bus.

3. The method of claim 2, wherein the bus comprises at least one Universal Serial Bus, at least one Peripheral Component Interconnect Bus, or at least one AT bus, or at least one wireless bus, or at least one optical bus.

4. The method of claim 2, wherein said controlling the at least one device via commands appropriate to the bus further comprises:
   controlling at least one device associated with docking.

5. The method of claim 2, wherein said controlling the at least one device via commands appropriate to the bus further comprises:
   controlling at least one power supply in a docking station.

6. The method of claim 5, wherein said controlling at least one power supply in a docking station further comprises:
   activating a power supply having voltage appropriate to a portable computer system.

7. The method of claim 2, wherein said controlling the at least one device via commands appropriate to the bus further comprises:
   controlling at least one power rail that supplies power to a portable computer system.

8. The method of claim 1, wherein said detecting a docking device class circuit present on a bus further comprises:
   detecting an identifier associated with the docking device class circuit.

9. The method of claim 8, wherein said detecting an identifier associated with the docking device class circuit further comprises:
   detecting an identification number reserved for the docking device class circuit.

10. A method comprising:
    detecting a docking device class circuit present on a bus; and
    obtaining a description of at least one device in a docking station from the docking device class circuit by obtaining a list of devices under the control of the docking device class circuit, wherein the obtaining a list of devices includes obtaining a list of devices under the control of a general purpose I/O device under the control of the docking device class circuit.

11. A method comprising:
    detecting a docking device class circuit present on a bus; and
    obtaining a description of at least one device in a docking station from the docking device class circuit by obtaining a list of devices under the control of the docking device class circuit, wherein the obtaining a list of devices includes obtaining driver code appropriate to the at least one device.

12. A method comprising:
    detecting a docking device class circuit present on a bus; and
    obtaining a description of at least one device in a docking station from the docking device class circuit by obtaining a list of devices under the control of the docking device class circuit, wherein the obtaining a list of devices includes obtaining driver code appropriate to the docking device class circuit.

13. A method comprising:
    detecting a docking device class circuit present on a bus; and
    obtaining a description of at least one device in a docking station from the docking device class circuit by obtaining a list of devices under the control of the docking device class circuit, wherein the obtaining a list of devices includes obtaining driver code combination set appropriate to both the docking device class circuit and the at least one device.

14. A method comprising:
    detecting a docking device class circuit present on a bus; and
    obtaining a description of at least one device in a docking station from the docking device class circuit by obtaining a list of devices under the control of the docking device class circuit, wherein the obtaining a list of devices includes obtaining a bus description table from the docking device class circuit.

15. A method comprising:

detecting a docking device class circuit present on a bus; and obtaining a description of at least one device in a docking station from the docking device class circuit by obtaining a list of devices under the control of the docking device class circuit, wherein the obtaining a list of devices includes obtaining a description of at least one Peripheral Component Interconnect bus resident within a docking device, or at least one Universal Serial Bus resident within a docking device, or at least one Accelerated Graphics Port Bus resident within a docking device, or at least one AT bus resident within a docking device, or at least one proprietary bus, or at least one wireless bus, or at least one optical bus.

16. A docking station comprising:

a docking connector for coupling a portable computer system to the docking station; and a docking device class circuit, coupled to the docking connector the docking device class circuit providing the portable computer system with a description of at least one device in the docking station by obtaining a list of devices under the control of the docking device class circuit, including obtaining a list of devices under the control of a general purpose I/O device under the control of the docking device class circuit.

17. The docking station of claim 16, further comprising:

the docking device class circuit operably coupled to a device associated with docking.

18. The docking station of claim 17, further comprising:

the docking device class circuit operably coupled to at least one device associated with ad hoc functions or at least one power supply device.

19. The docking station of claim 16 wherein the docking device class circuit includes a bus description table.

20. The docking station of claim 16 further comprising:

at least one optical connector or at least one wireless connector.

\* \* \* \* \*